United States Patent
Huang (10) Patent No.: US 8,111,460 B1
(45) Date of Patent: Feb. 7, 2012

(54) SOLAR TRACKING SKYLIGHT SYSTEM FOR ILLUMINATION

(75) Inventor: Po-Chuan Huang, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 12/858,036

(22) Filed: Aug. 17, 2010

(51) Int. Cl.
*G02B 17/00* (2006.01)
*G01C 21/02* (2006.01)

(52) U.S. Cl. ........ 359/591; 359/592; 359/593; 359/594; 359/595; 359/596; 126/573; 126/574; 126/601; 126/606; 126/607

(58) Field of Classification Search .......... 359/591–598; 126/573, 574, 601, 605–607; 136/244, 246, 136/251; 74/469; 248/176.1, 176.3; 396/427; 348/143
See application file for complete search history.

(56) References Cited

U.S. PATENT DOCUMENTS

| | | | | |
|---|---|---|---|---|
| 3,565,719 A * | 2/1971 | Webb et al. | .................... | 156/212 |
| 4,332,238 A * | 6/1982 | Garcia, Jr. | .................... | 126/578 |
| 4,361,758 A * | 11/1982 | Rotolo | .................... | 250/203.4 |
| 4,883,340 A * | 11/1989 | Dominguez | .................... | 359/593 |
| 4,957,187 A * | 9/1990 | Burgess | .................... | 184/6.12 |
| 5,169,456 A * | 12/1992 | Johnson | .................... | 136/246 |
| 6,281,485 B1 * | 8/2001 | Siri | .................... | 250/203.4 |
| 7,387,453 B2 * | 6/2008 | Arbuckle | .................... | 396/419 |
| 7,507,941 B2 * | 3/2009 | Yeh et al. | .................... | 250/203.4 |
| 7,813,041 B2 * | 10/2010 | Briee et al. | .................... | 359/591 |
| 7,847,182 B2 * | 12/2010 | Lin et al. | .................... | 136/246 |
| 2004/0187908 A1 * | 9/2004 | Muhs et al. | .................... | 136/246 |
| 2008/0066735 A1 * | 3/2008 | Yeh et al. | .................... | 126/578 |
| 2008/0178867 A1 * | 7/2008 | DiDomenico | .................... | 126/573 |
| 2009/0277496 A1 * | 11/2009 | Khazeni et al. | .................... | 136/246 |
| 2010/0224181 A1 * | 9/2010 | Chen et al. | .................... | 126/578 |
| 2010/0276570 A1 * | 11/2010 | Moser | .................... | 250/203.4 |
| 2010/0307479 A1 * | 12/2010 | Park | .................... | 126/601 |
| 2010/0326427 A1 * | 12/2010 | Chen | .................... | 126/601 |
| 2011/0163222 A1 * | 7/2011 | Moser | .................... | 250/203.4 |

* cited by examiner

*Primary Examiner* — Clayton E Laballe
*Assistant Examiner* — Kevin Butler
(74) *Attorney, Agent, or Firm* — Muncy, Geissler, Olds & Lowe, PLLC (57) ABSTRACT

The present invention provides a solar tracking skylight system for illumination, primarily including a light guide, a solar tracking controller, a two-axis tracking mechanism, an energy converter and energy storage system, and a weather protective cover. The system uses the solar tracking controller to detect the direction of the light, thereby enabling the two-axis tracking mechanism to move toward the light to facilitate the light guide in collecting light and diffusing it indoors for illumination use. The protective cover provides waterproofing, and the energy converter and energy storage system is used to store electrical energy generated by the solar energy panel for system use. External power is not needed for the system to operate and provide indoor lighting, thereby achieving the objective of saving energy and reducing carbon emissions.

4 Claims, 8 Drawing Sheets

SOLAR TRACKING SKYLIGHT SYSTEM FOR ILLUMINATION

BACKGROUND OF THE INVENTION (a) Field of the Invention

The present invention provides a solar tracking skylight system for illumination, which directs natural light indoors for illumination use, thereby achieving the objective of providing lighting without the use of electricity.

(b) Description of the Prior Art

Lighting is closely tied to and inseparable from human life, causing the steady increase in electricity utilization for lighting. Hence, how to cut down on energy consumption is a major issue. Recently, various countries have successively carried out research on using and guiding sunlight (natural light) indoors for illumination use, and the means used to accomplish this are roughly divided into direct and indirect methods. The direct means guides sunlight indoors for illumination use; the indirect means converts sunlight into electrical energy for illumination use. The latter uses solar battery modules to carry out photoelectric conversion, but has the shortcomings of low efficiency and high cost. Because the former methods directly guide sunlight indoors for application thereof, thus, efficiency is increased. Moreover, because sunlight is directly used for illumination, there is no need for electric power, thereby achieving the effectiveness of saving energy and reducing carbon emissions, and is thus receiving much attention. However, because it is a fixed natural light illumination system, thus, its effectiveness is limited. In order to improve light collecting effectiveness, a solar tracking sunlight lighting system is proposed. Regarding the solar tracking system, a solar tracking mechanism thereof is divided into single axis and two-axis drive, in which, generally speaking, the two-axis mechanism is able to model movement of the solar orbit more effectively than the single axis mechanism. Moreover, controlling driving of the rotating shaft for tracking is divided into passive and active controlled tracking, in which path movement of the sun is calculated in advance in so-called passive tracking, and a tracking device is then made to rotate according to the solar orbit. Because a controller directly outputs signals to a driving end, thus, it is also called open-loop control; whereas active tracking is generally implemented by a light sensor device detecting the position of the sun to cause the tracking device to be orthogonal thereto. Because the output signals causes negative feedback on the input signals, thus, it is also called closed-loop control. Many silicon crystal solar batteries function in coordination with single axis active tracking devices to increase electric energy generation, thereby providing approximately 20-30% higher efficiency compared to fixed solar energy modules. The majority of two-axis tracking devices are primarily used for tracking, and two-axis passive tracking primarily enables simplification of control flow, thereby avoiding the problems of noise interference in the closed-loop control and weather influencing the sensing precision. Because sunlight is directly guided indoors for illumination, thus, the use efficiency of solar energy is high, and in recent years research teams have already appeared, researching the application concept of directly guiding sunlight indoors, primarily taking into consideration technical feasibility, economic benefit, energy saving, whether components are easy to replace, consumer acceptance, and so on, with some products already integrated into buildings. However, the size of the light collecting portion of these systems is relatively large, or consists of many and complicated components, or the light collecting rate is low. Accordingly, it can be inferred that market acceptance is limited. Hence, the challenging goal for future development of new style sunlight collecting devices can be roughly divided into the following items: 1. structure: light, aspect ratio of the components must be at least greater than 10; 2. cost: inexpensive, easy to fabricate, and simple components; 3. benefit: low light loss, high uniformity, with light collecting rate greater than 50%. In consequence of the prior art technology having the aforementioned shortcomings, the present invention is composed of a light guide, a solar tracking controller, a two-axis tracking mechanism, an energy converter and energy storage system, and a weather protective cover, thereby enabling the collection of light and diffusion indoors for use thereof. In which the component members are simple and light, easy to operate, assemble and install. Moreover, the present invention provides protection against rain, consumes little electric power, and has a long serviceable life. Using a large number together achieves the objective of reducing carbon emissions, and also resolves the shortcomings of the prior art technology. The present invention uses green technology that protects the environment to provide an excellent product.

SUMMARY OF THE INVENTION

A solar tracking skylight system for illumination of the present invention is assembled to comprise a light guide, a solar tracking controller, a two-axis tracking mechanism, an energy converter and energy storage system, and a weather protective cover. Operation involves sensing a light source, after which the system rotates toward the light source and collects light and guides it indoors for use thereof. The protective covering provides waterproofing, and the energy converter and energy storage system is used to generate electricity for use by the system. The present invention is an energy saving product that does not need external electrical power.

The present invention collects natural light for use thereof, thereby reducing the need to turn on electric lights. In addition, the present invention filters ultraviolet rays, and change in time does not affect maintaining indoor lighting, while equally maintaining the same uniform brightness, thereby providing the effectiveness of indoor sunlight illumination.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
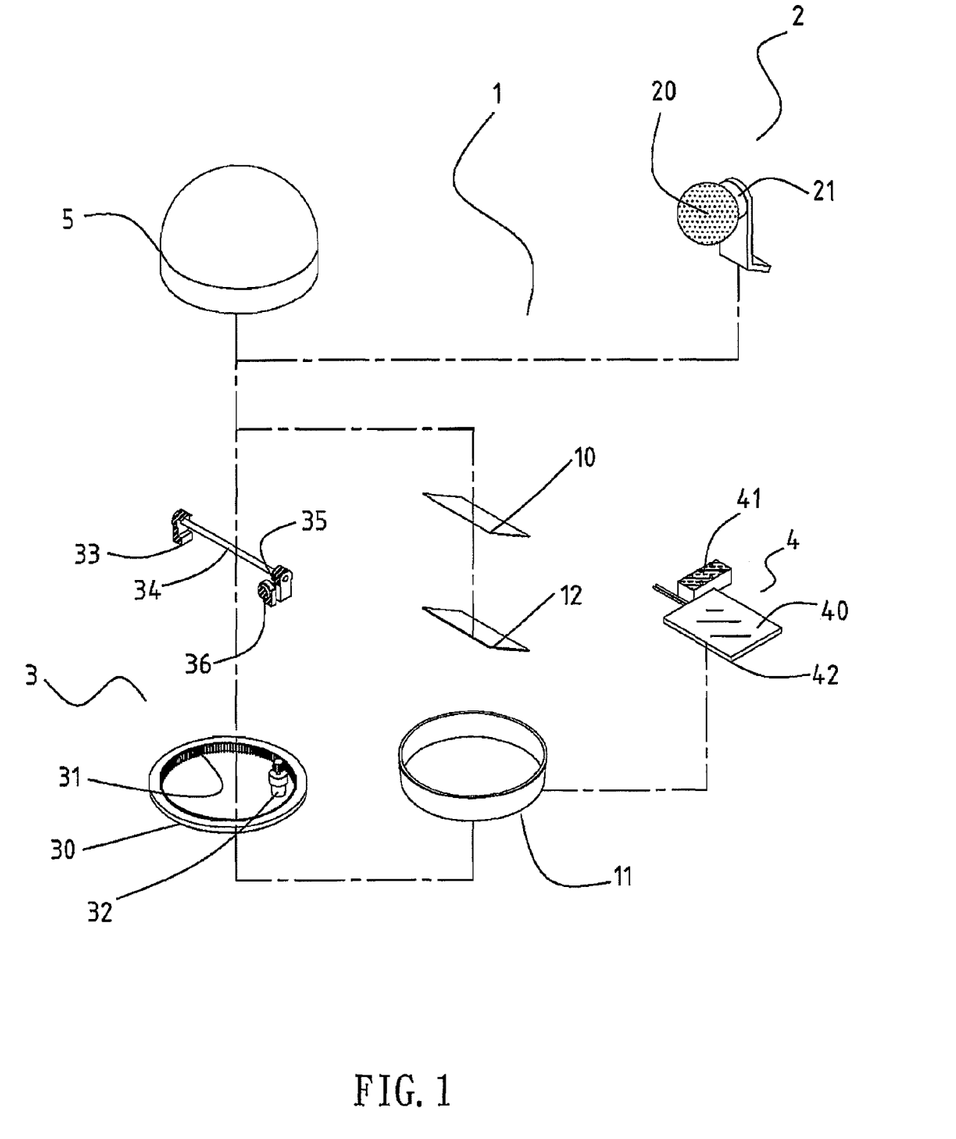
FIG. 1 is an exploded view of the present invention.
Figure 2:
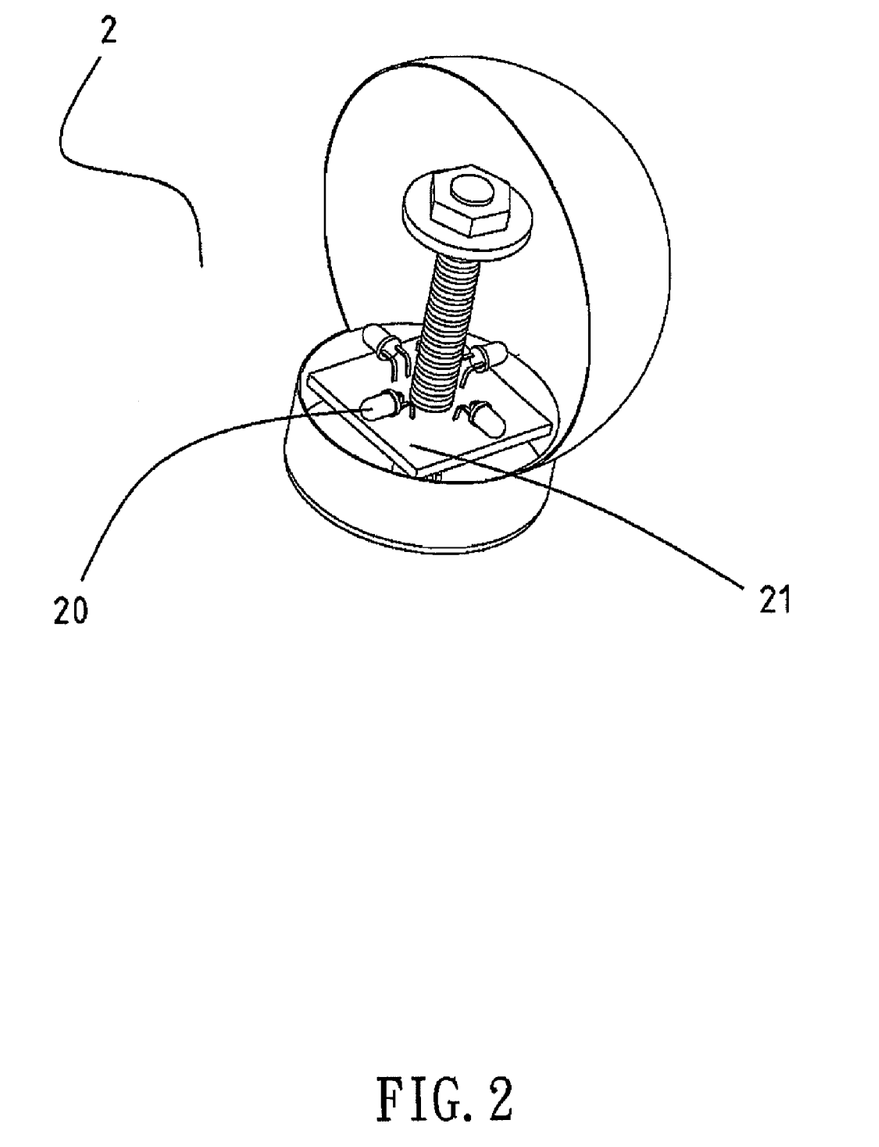
FIG. 2 is a structural view depicting a solar tracking controller of the present invention.
Figure 3:
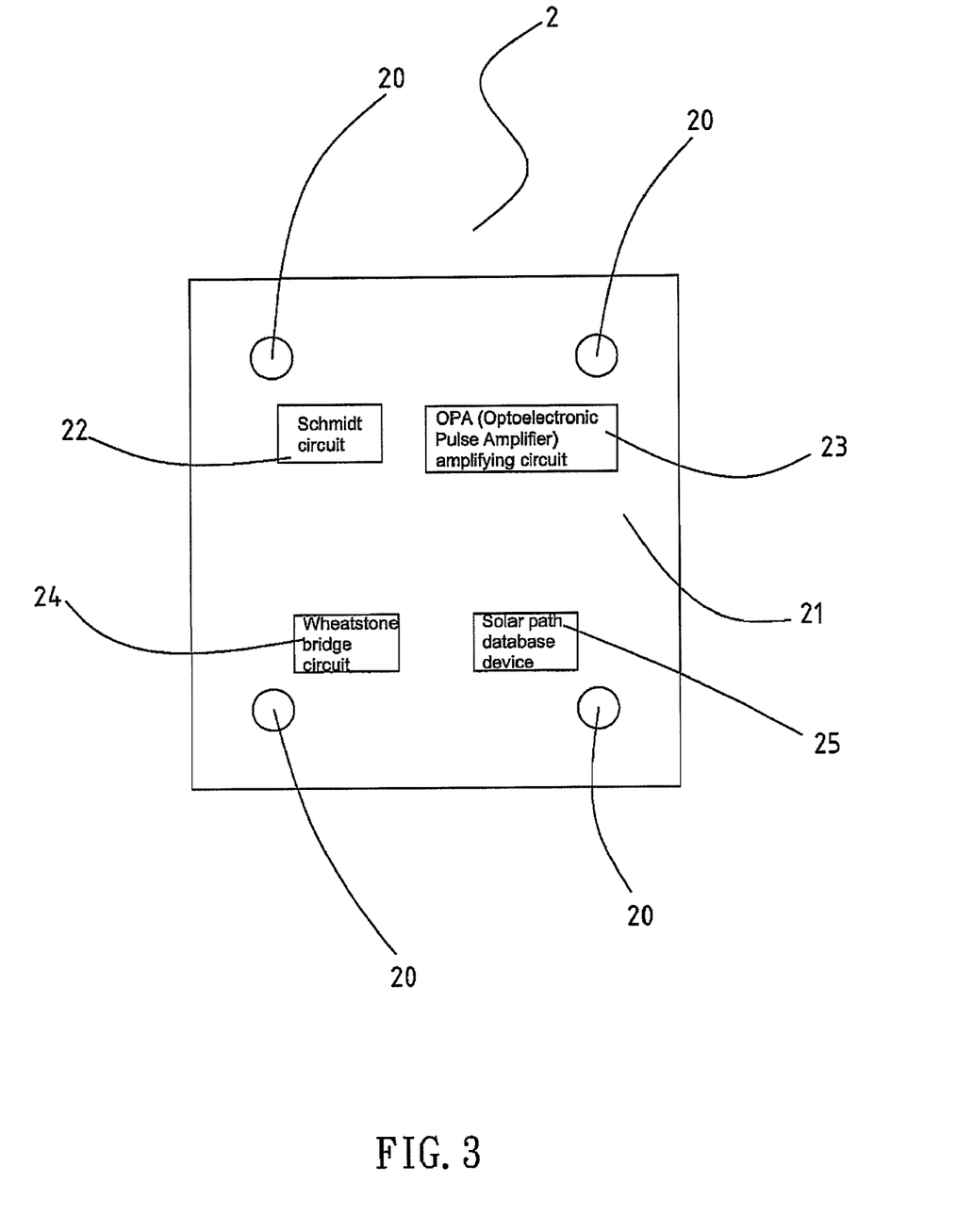
FIG. 3 is a circuit structural view of the solar tracking controller of the present invention.

Referring to all the drawings, the solar tracking skylight system for illumination of the present invention guides natural light indoors for illumination thereof, thereby achieving the objective of illumination without the use of electricity. When implementing the present invention:

The solar tracking skylight system for illumination of the present invention (see FIGS. 1 and 2) is assembled to primarily comprise a light guide 1, a solar tracking controller 2, a two-axis tracking mechanism 3, an energy converter and energy storage system 4, and a weather protective cover 5, in which the two-axis tracking mechanism 3 serves as a base for movement and operation. The two-axis tracking mechanism 3 is provided with a gear ring 30 having gear teeth 31 formed on one side thereof, and the gear teeth 31 couple with a motor 32. Coupling of the motor 32 with the gear teeth 31 of the gear ring 30 drives the gear ring 30 to cause horizontal rotation of the gear ring 30. At least one supporting rod 33 is fitted to an upper end surface of the gear ring 30, a cross bar 34 is located on the supporting rods 33, and a gear rack 35 is formed at one end. A motor 36 is located at the area of the gear rack 35 to drive and rotate the cross bar 34. Because the mechanism of the present invention is a two-dimensional configuration, thus, it provides a minimum component composite unit design, presenting characteristics of simplicity, lightness, and easy operation. The light guide 1 is located on the two-axis tracking mechanism 3, and is assembled to comprise at least a light guide plate 10 and a light amplifying plate 11, in which the light guide plate 10 guides light to the light amplifying plate 11, and, using the principle of optics, guides the light indoors, diffusing the light to form uniform light for illumination use thereof; that is, the light guide plate 10 is located outdoors, while the light amplifying plate 11 is located indoors, the light guide plate 10 totally reflecting and guiding the light indoors, whereupon the light amplifying plate 11 refracts and emits the light using multi-angle means. In order to achieve maximum efficiency in reflecting the sunlight indoors, light reflectivity of the material surface of the light guide plate 10 must be large, and the light guide plate 10 must be of light weight. The present invention applies high light reflective plate material to fabricate the light guide plate 10, such as aluminum, polished stainless steel metal plate (such as ultra-thin stainless steel mirror plate, or thin nickel plated plastic plate), glass mirror, and the like, and the light amplifying plate 11 comprises an optical filming plated with a layer of diffusion barrier to enable downward uniform diffusion of the light, and achieve the objective of uniform light amplification. In which the light guide plate 10 is fitted to the cross bar 34 of the two-axis tracking mechanism 3, and the light amplifying plate 11 is located in the gear ring 30 of the two-axis tracking mechanism 3. When the two-axis tracking mechanism 3 is moving followed by the guided light, in order to take into consideration the sunlight being too intense and injuring persons indoors, a light filter 12 can be additionally fitted in the light path to cut off the harmful light. In which the light filter 12 can be formed using a coating film or light-filter glass able to cut off the harmful light, and disposed position of the light filter 12 can be the inner surface of the weather protective cover 5 or the front, rear surface of the light guide plate 10. The energy converter and energy storage system 4 is an apparatus assembled from a solar energy panel 40 and an energy storage battery 41 that converts light energy into electrical energy, and is fitted to one side of the two-axis tracking mechanism 3. The energy converter and energy storage system 4 is used to supply the solar tracking controller 2 and the two-axis tracking mechanism 3 with system electricity, thereby achieving the objective of providing a system that does not need an external power supply. In which, when the solar energy panel 40 receives light producing electric displacement and electrification, then conducting wires fitted to the main body are used to carry the electrical energy to a circuit board 42 mounted on the bottom end of the solar energy panel 40 for integrated input to the battery 41 for storage and use thereof. In which the solar energy panel 40 can be located on the cross bar 34 of the two-axis tracking mechanism 3 to enable movement along therewith, thereby obtaining more exposure to the sunlight source to improve electric generation effectiveness. The solar tracking controller 2 is a solar tracking system, which is located on one side of the two-axis tracking mechanism 3, and can be located at the position of the gear ring 30, the light amplifying plate 11 or the light guide plate 10 according to needs. The solar tracking controller 2 comprises a plurality of light sensor photoconductive cells (photoresistors) 20 for detecting a light source and a circuit board 21 fitted at the lower end thereof (as depicted in FIGS. 2, 3). The circuit board 21 comprises at least a Schmidt circuit 22, an OPA (Optoelectronic Pulse Amplifier) amplifying circuit 23, a Wheatstone bridge circuit 24 and related protective electronic components. In which, the photoconductive cells (photoresistors) 20 are also known as light propagation devices or light sensor devices, which are non-polar differentiation electronic components having photosensitive characteristics. Because of a photo-conductivity effect, when illuminated with light, the resistance value of the photoconductive cells (photoresistors) 20 changes along with the strength of light intensity, that is, the stronger the light intensity, the smaller the resistance value. The Schmidt circuit 22 is used to obtain α (alpha) and γ (gamma) signals, primarily using signals obtained from the photoconductive cells (photoresistors) 20 to input into a circuit block in the Schmidt circuit 22 to compare and obtain α (alpha) and γ (gamma) signals. The OPA amplifying circuit 23 appropriately amplifies the signals from the Schmidt circuit 22 at a front end to facilitate correct identification, reading and output of the signals. The Wheatstone bridge circuit 24 is used to actuate and operate the motors 32, 36 of the two-axis tracking mechanism 3. In which the photoconductive cells (photoresistors) 20 are located in the east, west, south, and north positions of the solar tracking controller 2 system, and operation of the entire solar tracking controller 2 involves the photoconductive cells (photoresistors) 20 sensing the intensity strength of the light source from four directions and inputting the signals into the Schmidt circuit 22 for comparative analyzes. After which, the signals enter the OPA amplifying circuit 23 for amplification, identification, and reading to output signals to the Wheatstone bridge circuit 24 to actuate or not actuate operation of the motors 32, 36 of the two-axis tracking mechanism 3. The weather protective cover 5 located on the outer edge of the two-axis tracking mechanism 3 covers the entire mechanism, thereby protecting against wind, and preventing water from entering the system and damaging operation thereof. The weather protective cover 5 has the characteristic of being pervious to light, thereby facilitating the penetration of light for the system to collect and make use thereof.

Figure 4:
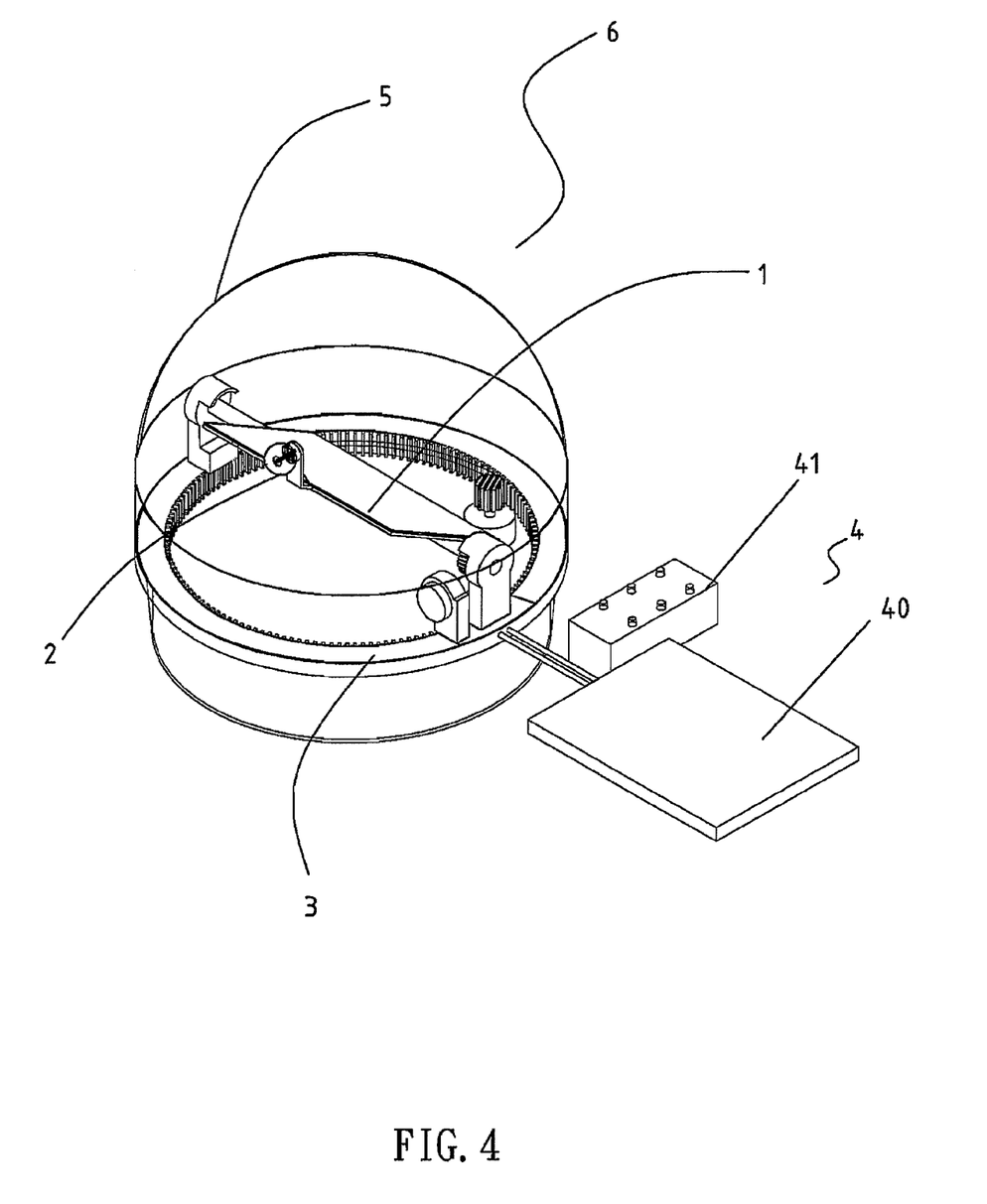
FIG. 4 is an elevational structural view of the present invention.
Figure 5:
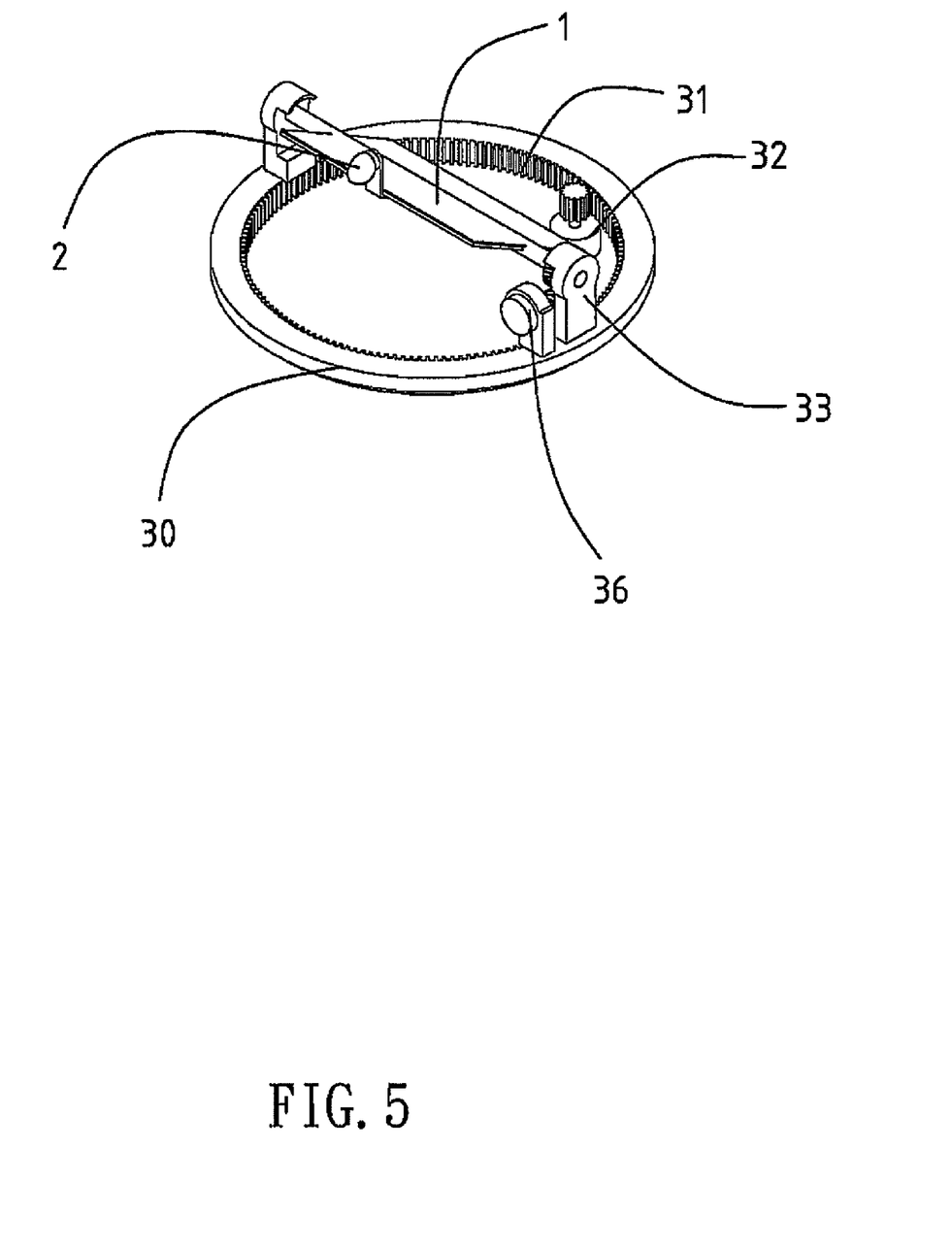
FIG. 5 is an implementation diagram 1 depicting solar tracking movement according to the present invention.
Figure 6:
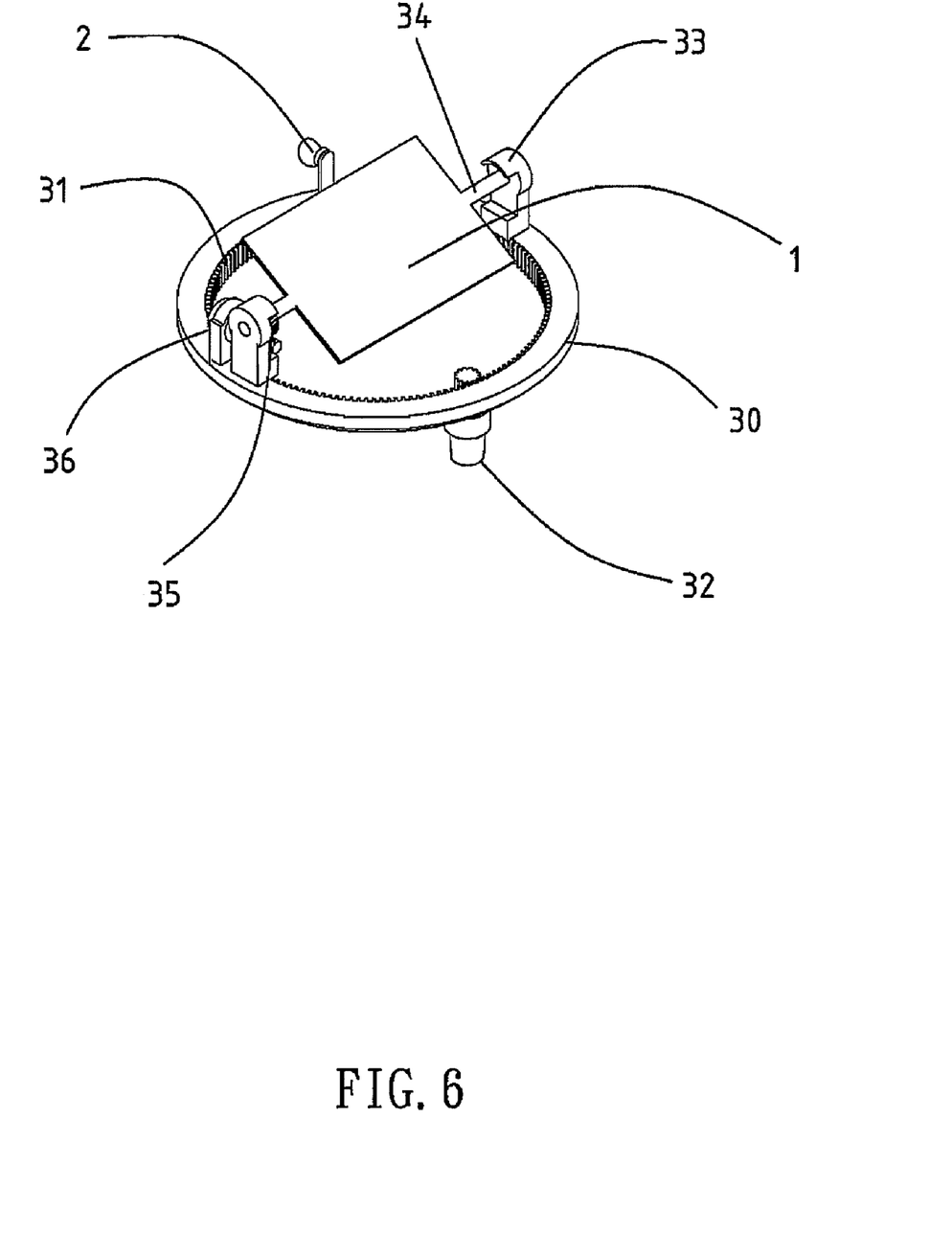
FIG. 6 is an implementation diagram 2 depicting solar tracking movement according to the present invention.
Figure 7:
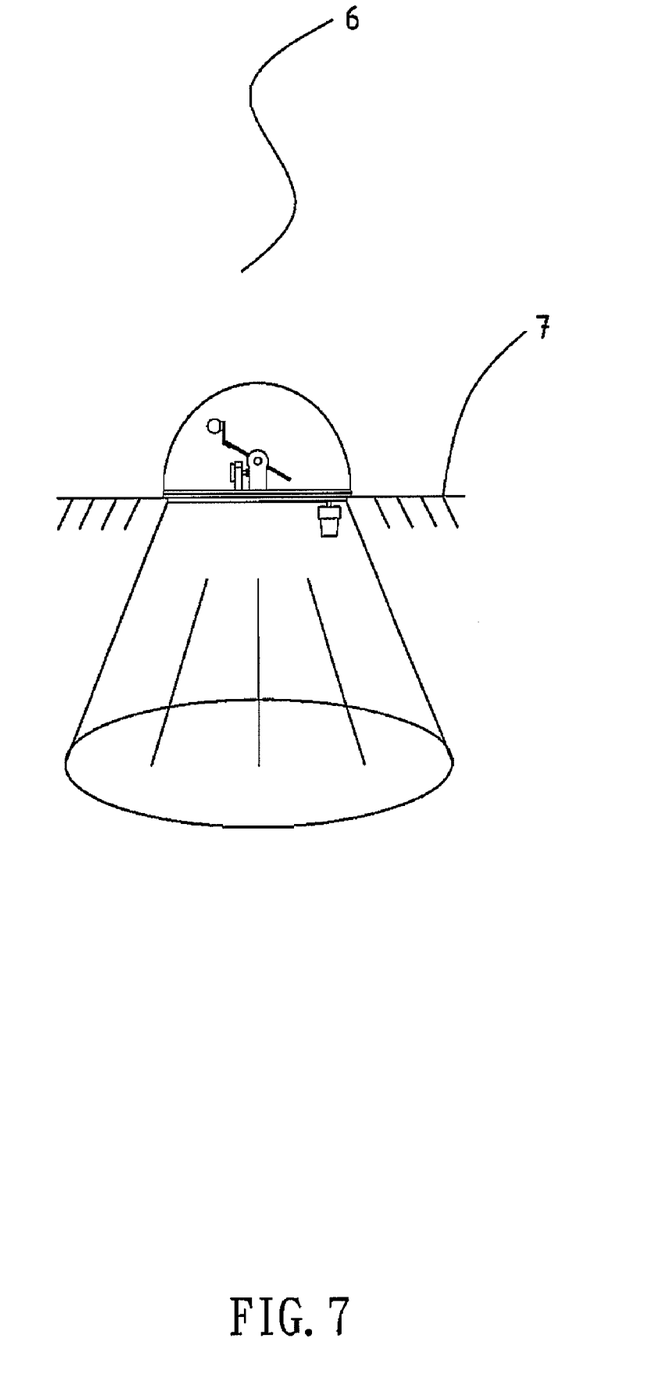
FIG. 7 shows an embodiment of the present invention directing light.

A solar tracking skylight system for illumination 6 (as depicted in FIGS. 4, 5, and 6) is formed after the aforementioned components have been assembled and installed at a light collecting position. After actuating, the system returns to an initial point, whereupon the solar tracking controller 2 tracks the direction of sunlight during operation, and transmits electric signals to cause the two-axis tracking mechanism 3 to rotate toward the direction of sunlight, thereby enabling the light guide 1 to collect light, whereupon a uniform light source diffuses from the light amplifying plate 11 and is guided indoors 7 to enable illumination thereof. Moreover, change in time does not affect maintaining indoor daylight illumination, while equally maintaining the same uniform brightness (as depicted in FIG. 7). Electric power for operating the system is self-sufficient, coming from the solar energy panel 40 of the energy converter and energy storage system 4 generating electricity that is stored in the battery 41, thereby completely eliminating the need for external power. However, external electric power can be used when large quantities of electricity are required to reduce and achieve the objective of zero carbon emissions to provide a green environment.

Figure 8:
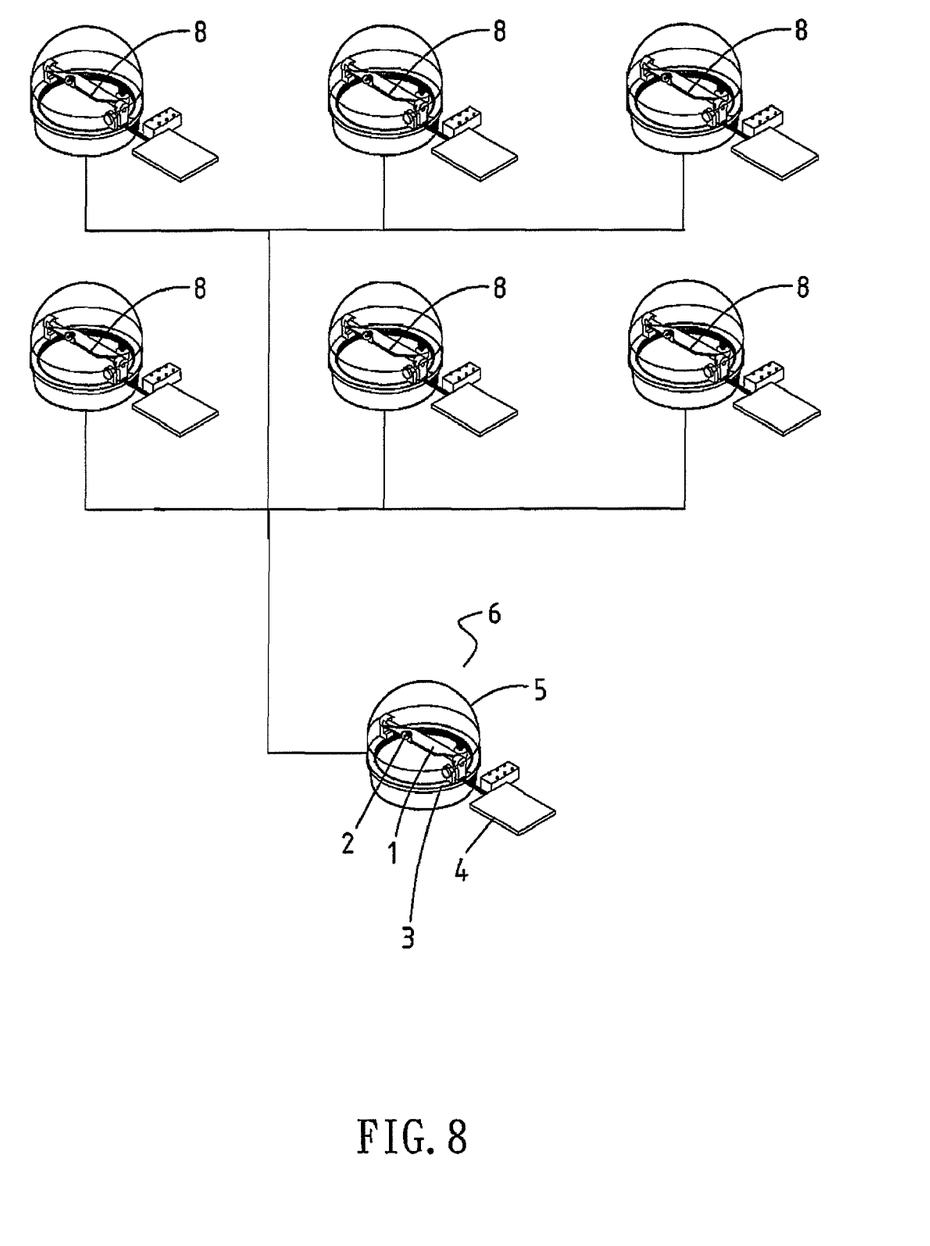
FIG. 8 is an application schematic diagram depicting implementation and control of a plurality of systems according to the present invention.

Furthermore, when a large number of the solar tracking skylight system for illumination 6 are used, then the solar tracking controller 2 is only installed in the master controller (as depicted in FIG. 8), and other indirect solar tracking skylight systems for illumination 8 are not fitted with the solar tracking controller 2. The master controller outputs electric signals to control operation of the motors 32, 36 of each of the indirect solar tracking skylight systems for illumination 8, and thereby similarly enables solar tracking illumination, while saving on cost of components.

In addition, referring to FIG. 3 at the same time, in order to improve efficiency, a year-round solar path database device 25 is installed in the circuit board 21, such as a chip with solar path data burnt into the chip, or a device provided with such functionality, in which a complete record of year-round solar path data for a certain area (such as Taiwan) is burnt into the device. Accordingly, when the solar tracking controller 2 is unable to operate, then the device is actuated to cause the two-axis tracking mechanism 3 to rotate toward the direction of the sun, and automatically fix position at the angle of the sun at that time to collect light, as well as causing the two-axis tracking mechanism 3 to move according to the recorded solar path, thereby enabling the system to continue operation.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A solar tracking skylight system for illumination, comprising a light guide, a solar tracking controller, a two-axis tracking mechanism, an energy converter and energy storage system, and a weather protective cover, the two-axis tracking mechanism is a base body provided with a gear ring, gear teeth are formed on one side of the gear ring, and the gear teeth couple with a motor, supporting rods are fitted to an upper end surface of the gear ring, a cross bar is located on the supporting rods, and a gear rack is formed at one end, driven by a motor located thereat;

the light guide is provided with a light guide plate, a light amplifying plate and a light filter, wherein the light guide plate is located on the supporting rods, the light amplifying plate is located within the gear ring, and the light filter is located in the light path of the light guide plate and the light amplifying plate;

the solar tracking controller is suitably located on the two-axis tracking mechanism, and is provided with photoconductive cells (photoresistors) mounted on a circuit board at a lower end thereof, to implement solar tracking, the circuit board comprises at least a Schmidt circuit, an OPA (Optoelectronic Pulse Amplifier) amplifying circuit, and a Wheatstone bridge circuit;

the energy converter and energy storage system is fitted to one side of the two-axis tracking mechanism, to store electrical energy for use by the system, the energy converter and energy storage system comprises a solar energy panel, a battery and a circuit board;

the weather protective cover is located on the outer edge of the two-axis tracking mechanism, and covers the entire mechanism, the weather protective cover has the characteristic of being pervious to light to facilitate the penetration of a light source;

accordingly, the solar tracking skylight system for illumination is assembled to readily collect and diffuse light to form uniform light that is guided indoors for illumination use, eliminating the need for external power, and achieving the objective of saving energy and reducing carbon emissions.

2. The solar tracking skylight system for illumination according to claim 1, comprising the light guide, the solar tracking controller, the two-axis tracking mechanism, the energy converter and energy storage system, and the weather protective cover, wherein the solar tracking controller is only installed in a master controller, other indirect solar tracking skylight systems for illumination are not installed with the solar tracking controller, and the master control outputs electric signals to control operation of the indirect solar tracking skylight systems for illumination, thereby similarly achieving the objective of providing solar tracking illumination.

3. The solar tracking skylight system for illumination according to claim 1, comprising the light guide, the solar tracking controller, the two-axis tracking mechanism, the energy converter and energy storage system, and the weather protective cover, wherein the a solar path database device is installed in the circuit board, thereby achieving the objective of enabling the two-axis tracking mechanism to rotate toward the direction of the sun, and automatically fix position at the angle of the sun at that time to collect light, as well as causing the two-axis tracking mechanism to move according to the recorded solar path.

4. The solar tracking skylight system for illumination according to claim 1, comprising the light guide, the solar tracking controller, the two-axis tracking mechanism, the energy converter and energy storage system, and the weather protective cover, wherein the base body of the two-axis tracking mechanism is provided with the gear ring, the gear teeth being formed on one side of the gear ring, and the gear teeth couple with the motor, the supporting rods are fitted to the upper end surface of the gear ring, the cross bar is located on the supporting rods, and the gear rack is formed at one end, driven by a motor located thereat;

the light guide is provided with the light guide plate, the light amplifying plate and the light filter, wherein the light guide plate is located on the supporting rods, the light amplifying plate is located within the gear ring, and the light filter located in the light path of the light guide plate and the light amplifying plate is used to cut off harmful light rays, wherein the light filter is a coating film or a light-filter glass.

* * * * *